July 3, 1962    R. H. BOOTH ET AL    3,042,307
TRIGONOMETRIC FUNCTION GENERATORS
Filed April 25, 1958
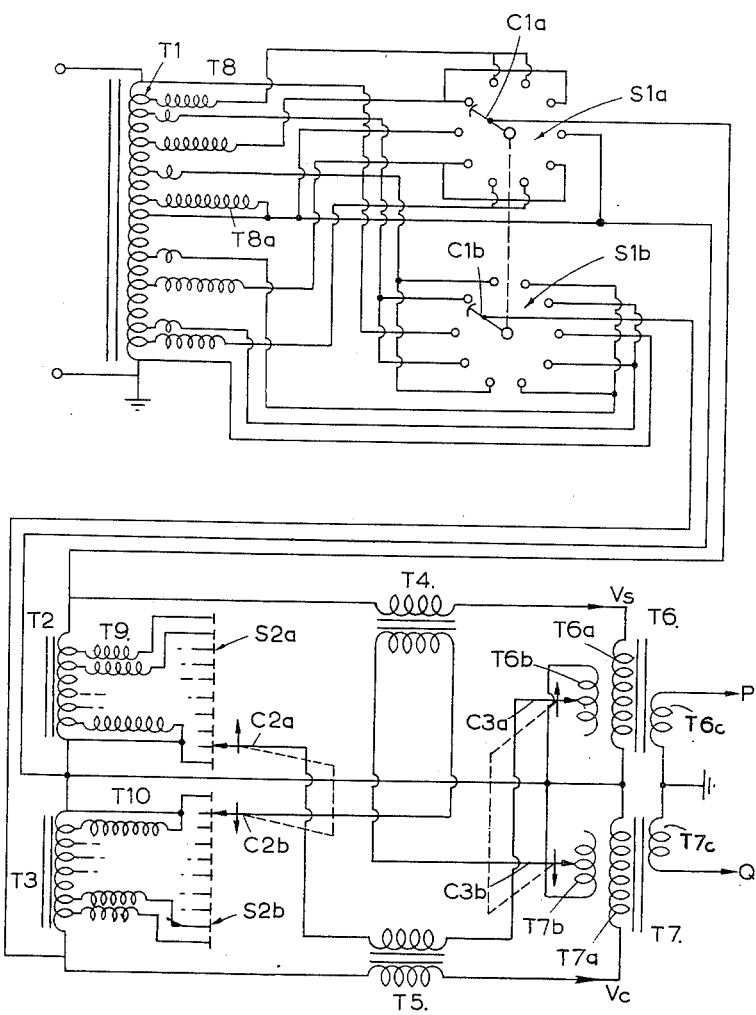
Inventors
R.H. Booth
A.T. MacDonald
By Hancock Downing Seebold
Attys.

United States Patent Office

3,042,307
Patented July 3, 1962

---

3,042,307
TRIGONOMETRIC FUNCTION GENERATORS
Richard Herbert Booth, Beaconsfield, and Alexander Torrence MacDonald, Gerrards Cross, England, assignors to Electric & Musical Industries Limited, Hayes, England, a company of Great Britain
Filed Apr. 25, 1958, Ser. No. 730,961
Claims priority, application Great Britain Apr. 30, 1957
5 Claims. (Cl. 235—186)

This invention relates to circuits for generating signals representing trigonometrical functions, and it relates especially though not exclusively to such circuits for generating signals for use with positioning devices using planar zig-zag inductances.

A positioning device which makes use of planar zig-zag inductances, and is sometimes known as an Inductosyn, has been proposed for positioning the carriage of an automatic machine such as a milling machine. For example a series of controls may be provided, adjustable manually to positions representing a desired displacement and the carriage of the machine, say, is then driven by servo means until the desired displacement of the carriage is obtained. The controls provide alternating voltages the amplitudes of which are trigonometrical functions of the displacement required, taking a given unit displacement to correspond to an angle of $2\pi$. Moreover it has been usual hitherto to employ feedback amplifiers between the controls of the zig-zag inductances because of the very low impedance of said inductances. Taking a typical example, the impedance of a zig-zag inductance may be 0.5 ohm and the current required to operate it may be about 300 milliamps so that a small uncertainty in the value of the output impedance of the source supplying this current can lead to large errors in the actual amplitude of the signal developed in the inductance. Moreover, even if the impedance problem is solved, there remains the problem of setting up the alternating signals required with adequate accuracy. It has been proposed to do this by means of tapped double-wound auto-transformers, but to obtain a sufficient accuracy by such means is difficult without employing transformers having a very large number of turns.

The object of the present invention is to reduce the disadvantages indicated.

In a positioning device, using planar zig-zag inductances, a long inductance, which may be termed the "scale," is usually fixed to the table, or other part of the machine to be moved, while a cursor or slide is fixed to the bed of machine, so as to be close to and parallel with the scale. The cursor carries two zig-zag inductances to which are applied alternating currents representing respectively the sine and cosine of a displacement required, specified on an angular scale as indicated above. The part of the machine on which the scale is fixed is servo controlled in response to the current induced in the scale inductance, and consequently this part of the machine is displaced so as to tend to make the current output of the scale inductance vanishingly small, and the disposition of the inductances on the cursor is such that this occurs when the displacement is that represented by the currents applied to the cursor inductances. Moreover the scale used is such that a displacement equal to the pitch of the inductances is represented as an angle of $2\pi$. The operation may be likened to that of a resolver in which the stator windings are equivalent to the cursor inductances and the rotor winding is equivalent to the scale inductance.

According to the present invention there is provided a circuit for deriving signals proportional to the sine and cosine of a desired angle by the addition of terms involving trigonometrical functions of partial angles which together equal the desired angle and wherein feedback signals from the output of the apparatus are employed in the formation of said terms.

In order that the present invention may be clearly understood and readily carried into effect, one example of a circuit according to the present invention, will be described with reference to the single figure of the accompanying drawings.

The circuit shown in the drawing is intended for use with a positioning device employing zig-zag inductances having a pitch of 0.1 inch. The circuit can set up signals proportional to the sine and cosine of angles in the range from 0 to 360° ($2\pi$) taken in steps of 0.36° so the subdivision of the interval of 0.1 inch by 1000 is possible, giving an accuracy of 0.0001 inch. A scale of ten is used, a digit of value 1 in the highest place corresponding to a displacement of 0.01 inch and giving rise to signals proportional to sin 36° and cos 36°. A digit of value 2 in the highest phase corresponds to a displacement of 0.02 inch, and gives rise to signals proportional to sin 72° and cos 72° respectively, and so in multiples of 36°. Similarly a digit of value 1 in the second place components to a displacement of 0.001 inch and gives rise to signals proportional to sin 3.6° and cos 3.6°, and so on in multiples of 3.6°. In the third digit phase, a digit of value 1 corresponds to displacement of 0.001 inch, and gives rise to signals proportional to sin 0.36° and cos 0.36° respectively, and so in multiples of 0.36°.

Referring to the drawing, associated with a series of tappings along an auto-transformer T1 energised by a source of reference alternating potential, are a series of ten studs S1a on one stud circle and a series of ten studs S1b on a further stud circle. The stud circles have a pair of rotatable contacts C1a and C1b respectively which are ganged on the same shaft, which can be rotated manually to a desired position. Considering the stud circle S1a, two of the studs of this circle are connected to the midpoint of T1 corresponding to linear displacements of 0.00 and 0.05 respectively and the amplitudes of the voltages applied to these studs are taken to represent the sines of 0° and 180°. The other studs in this circle receive voltages which have amplitudes representing the sines of angles of 36°, 72° and so on up to 324°. For this purpose the studs are connected to appropriate tappings on the auto-transformer T1 as indicated. However, to enable the required accuracy to be achieved with a relatively small number of turns on T1, thereby reducing the impedance of T1, incremental voltages are injected as necessary into the leads from T1 to the studs S1a by the windings of a transformer T8, the primary windings of which are energised by being connected across a section of the auto-transformer T1. All the windings of T8 are shown with their axes horizontal in the drawings, being wound on a separate core from the auto transformer T1. By this expedient, the auto-transformer need only have sufficient turns to provide, when tapped at whole turns, a coarse representation of the desired functions, the inaccuracy which would otherwise arise being corrected by the voltages injected by the transformer T8. The studs on the other stud circle S1b are connected to taps on T1 which together with increments injected by T8 yield voltages of which the amplitudes correspond to the cosines of angles 36°, 72° etc. The contacts C1a and C1b in the position shown correspond to a setting of 36°, and in general C1a and C1b select analogue signals having ratios of the reference potential applied across T1, which are proportional to sin A and cos A, where A is any multiple of 36° from 0 to 9 and is represented by the setting of these contacts. As indicated in the drawing, the lower end of T1 is earthed and not the mid point, so that the reference level in the circuit, prior to the output transformers, represents unity. The reference level is however restored to zero by the output transformers, which will be referred to subsequently.

The voltages derived by S1a and S1b are applied respectively across two further auto-transformers T2 and T3, which have separate flux paths. These auto-transformers have tappings connected to two series of studs S2a and S2b as indicated. The studs in each of these series form the stud circle of a decade switch similar to S1a, or S1b, but to simplify the illustration they are arranged in line in the drawing. The studs have rotatable contacts C2a and C2b ganged on a single shaft as in the case of C1a and C1b. The studs S2a are tapped to the points on the auto-transformer T2 which together with increments derived from a transformer T9 (like T8) yield voltages of which the amplitudes are proportional to tan 0°, tan 3.6°, tan 7.2° . . . up to tan 32.4°. Some of the connections are omitted in the drawing to simplify the illustration. The studs S2b likewise receive voltages of which the amplitudes are proportional to tan 0°, tan 3.6°, tan 7.2° . . . and so on, these voltages being applied from the transformer T3 and the increment-injecting transformer T10. The contact C2a is connected to one end of the primary winding of a transformer T5 and the contact C2b is connected to one end of the primary winding of a transformer T4, the connections of the primary windings of T4 being reversed compared with the primary winding of T3. The voltage induced at the contact C2a in the example illustrated is assumed to be sin $A$ tan $B$ and that induced at the contact C2b is assumed to be cos $A$ tan $B$ where B, being any multiple of 3.6° from 0 to 9, is represented by the setting of C2a and C2b.

Two outputs are obtained from the apparatus at the terminals P and Q and the output voltages are proportional respectively to $V_s$ and $V_c$ respectively, where $V_s$ is the amplitude of the voltage across the primary winding T6a of the output transformer T6, and $V_c$ is the amplitude of the voltage across the primary winding T7a of the second output transformer T7. The transformer T6 has a secondary winding T6b, tappings on which are connected to the studs of a decade switch similar to S1a, or S1b and from which voltages can be derived by a contact C3a proportional to tan 0°, −tan 0.36°, −tan 0.72° and so on to −tan 3.24°. The studs of this switch have been omitted in the drawing to simplify the illustration, and no increment-injecting transformer (like T8) is required in this case, since the contribution of this switch is small in any case. The transformer T7 has a secondary winding T7b, connected to a decade switch with a contact C3b, identical to the winding T6b and the corresponding decade switch with contact C3a. Let the voltage selected by the contact C3a have an amplitude representing −tan $C$, where C is any multiple of 0.36° from 0 to 9 and is represented by the settings of C3a. The voltage selected by C3b is then also −tan $C$. The voltage appearing across the primary winding of T4 is therefore (cos $A$ tan $B + V_c$ tan $C$) and that appearing across the primary winding of the transformer T5 is −(sin $A$ tan $B + V_s$ tan $C$).

The former voltage is added by the transformer T4 to the voltage representing sin $A$ and the latter voltage is added by the transformer T5 to the voltage representing cos $A$. Therefore $$V_s = \sin A + \cos A \tan B + V_c \tan C \quad (1)$$

$$V_c = \cos A - \sin A \tan B - V_s \tan C \quad (2)$$

$$V_c = \cos A - \sin A \tan B - \tan C \sin A - \tan C \cos A \tan B - V_c \tan^2 C$$

$$\therefore V_c = \frac{\cos A - \sin A \tan B - \tan C (\sin A + \cos A \tan B)}{(1 + \tan^2 C)}$$

$$= \frac{\begin{array}{c}(\cos A \cos B - \sin A \sin B) \cos C \\ -\sin C (\sin A \cos B + \cos A \sin B)\end{array}}{(1 + \tan^2 C) \cos B \cos C}$$

$$= \frac{\cos(A+B) \cos C - \sin C \sin(A+B)}{(1 + \tan^2 C) \cos B \cos C}$$

$$= \frac{\cos(A+B+C)}{(1 + \tan^2 C) \cos B \cos C}$$

$$= \cos(A+B+C) \times \frac{\cos C}{\cos B}$$

$$V_s = \sin A + \cos A \tan B + \tan C (\cos A - \sin A \tan B) - V_s \tan^2 C$$

$$\therefore V_s = \frac{\sin A + \cos A \tan B + \tan C (\cos A - \sin A \tan B)}{(1 + \tan^2 C)}$$

$$= \frac{\begin{array}{c}(\sin A \cos B + \cos A \sin B) \cos C \\ +\sin C (\cos A \cos B - \sin A \sin B)\end{array}}{(1 + \tan^2 C) \cos B \cos C}$$

$$= \frac{\sin(A+B) \cos C + \sin C \cos(A+B)}{(1 + \tan^2 C) \cos B \cos C}$$

$$= \frac{\sin(A+B+C)}{(1 + \tan^2 C) \cos B \cos C}$$

$$= \sin(A+B+C) \times \frac{\cos C}{\cos B}$$

$$\therefore \frac{V_s}{V_c} = \frac{\sin(A+B+C)}{\cos(A+B+C)}$$

$$= \tan(A+B+C)$$

The output voltages derived at P and Q have amplitudes in the ratio of sin $(A+B+C)/$ cos $(A+B+C)$ the other factors in the output voltages being immaterial provided they are equal. Moreover by selecting different multiples for the angles A, B and C a signal can be derived proportional to the ratio of the sine to the cosine of angles in the range 0 to 360°, taken in steps of 0.36°. As stated the subdivision is effected on a scale of 10, but obviously other scales of subdivision may be employed.

There is a step down ratio in the transformer T6 from the primary winding T6a to the secondary winding T6c, from which the output is derived, and similarly from the winding T7a to T7c of T7, to reduce the output impedances of the arrangement without impairing the accuracy obtained.

It may be said that, by virtue of the cross feedback from the outputs, the arrangement of transformers illustrated is capable of solving equations of the general form $$V_s = f(A, B, C, V_c)$$
$$V_c = g(A, B, C, V_s)$$

where $V_s$ and $V_c$ the outputs, are the quadrature trigonometrical functions required, and the sum of A, B and C represents, on the angular scale of the zig-zag inductances, the displacement which is required of the movable part. The form of the functions $f$ and $g$ is so chosen that the solutions take the general form $$V_s = \varphi(A+B+C) F(A, B, C)$$
$$V_c = g(A, B, C, V_s)$$

In view of the fact that the zig-zag inductances operate in a null fashion like a resolver the multiplying functions F do not impair the positioning provided they are equal. The invention enables high accuracy and low output impedance to be obtained with a relatively simple circuit.

What we claim is:

1. A circuit for deriving signals proportional to the sine and cosine of desired angles comprising means for deriving a first signal proportional to the sine of a major part of a desired angle, means for deriving a second signal proportional to the cosine of the same part of said angle, first output terminals for a first output signal, second output terminals for a second output signal, means connected from said second output terminals for deriving a first incremental signal proportional to the product of said second output signal and the tangent of a minor part of said desired angle, means connected from said first output terminals for deriving a second incremental signal proportional to the product of said first output signal and the tangent of said minor part of said desired angle, means for adding said first incremental signal to said first derived signal and for applying the resultant to said first output terminals thereby to produce said first output signal, and means for adding said second incremental signal to said second derived signal and for applying the resultant to said second output terminals thereby to produce said second output signal, whereby said first and second output signals are respectively proportional to the sine and cosine of the desired angle.

2. A circuit for deriving signals proportional to the sine and cosine of desired angles comprising means for deriving a first signal proportional to the sine of a major part of a desired angle, means for deriving a second signal proportional to the cosine of the same part of said angle, a first output transformer having primary turns energised by a first output signal, a second output transformer having primary turns energised by a second output signal, means for varying the number of secondary turns of said second output transformer to induce a first incremental signal across said secondary turns proportional to the product of said second output signal and the tangent of a minor part of said desired angle, means for varying the number of secondary turns of said first output transformer to induce a second incremental signal across said secondary turns proportional to the product of said first output signal and the tangent of said minor part of said desired angle, means for adding said first incremental signal to said first derived signal to produce said first output signal, means for adding said second incremental signal to said second derived signal to produce said second output signal, whereby said first and second output signals represent respectively the sine and cosine of said desired angle.

3. A circuit for deriving signals proportional to the sine and cosine of desired angles, comprising an auto-transformer, a first series of contacts connected to taps on said autotransformer, said first series of contacts representing a series of angles in a relatively large range of angles and the taps being selected to yield signals respectively representing the sines of said series of angles, a second series of contacts connected to taps on aid auto-transformer, said second series of contacts representing the same series of angles and the corresponding taps being selected to yield signals respectively representing the cosines of said series of angles, a first selector for selecting a signal from a selected one of said first series of contacts, a second selector for selecting a signal from the corresponding one of said second series of contacts, a first output transformer having primary turns energised by a first output signal, a second output transformer having primary turns energised by a second output signal, means for varying the number of secondary turns on said second output transformer to derive a first incremental signal across said secondary turns proportional to the product of said second output signal and the tangent of a desired angle within a smaller range of angles, means for varying the number of secondary turns on said first output transformer to derive a second incremental signal across said secondary turns proportional to the product of said first output signal and the tangent of the same desired angle within said smaller range of angles, means for adding said first incremental signal to the voltage selected by said first selector thereby to derive said first output signal, means for adding said second incremental signal to the voltage selected by said second selector thereby to derive said second output signal.

4. A circuit for deriving signals proportional to the sine and cosine of desired angles comprising a first auto-transformer, a first series of contacts representing a series of equally spaced angles within a large range of angles, said contacts being connected to taps on said first auto-transformer respectively yielding signals proportional to the sines of said series of angles, a second series of contacts representing the same series of angles and connected to taps respectively yielding signals proportional to the cosines of said series of angles, a first selector for selecting a signal from a particular one of said first series of contacts, a second selector for selecting a signal from the corresponding one of said second series of contacts, a second auto-transformer energised by the signal from said second selector, a third series of contacts representing a second series of equally spaced angles within a range of angles equal to the spacing of the said first series of angles, said third series of contacts being connected to taps of said third auto-transformer respectively yielding signals proportional to the tangents of said second series of angles, a third auto-transformer energised by the signal from said first selector, a fourth series of contacts representing said second series of angles and connected to taps on said third auto-transformer respectively yielding signals proportional to the tangents of said second series of angles, a third selector for selecting a signal from a particular one of said third series of contacts, a fourth selector for selecting a signal from the corresponding one of said fourth series of contacts, means for summing the signals from said first and third selectors to produce a first compound signal proportional to the sine of the sum of one of said first series of angles and one of said second series of angles, and means for differencing the signals from said second and fourth selectors to produce a second compound signal proportional to the cosine of the same sum of angles.

5. A circuit according to claim 4, further comprising a first output transformer having primary turns energised by a first output voltage, a second output transformer having primary turns energised by a second output voltage, means for varying the number of secondary turns of said second output transformer to provide a first incremental signal across said secondary turns proportional to the tangent of any one of a third series of angles within a range equal to the spacing of said second series of angles, means for varying the number of secondary turns of said first output transformer to provide a second incremental signal across said secondary turns proportional to the tangent of the same one of said third series of angles, means for summing said first incremental signal and said first compound signal to provide said first output signal, and means for differencing said second incremental signal and said second compound signal to provide said second output signal.

References Cited in the file of this patent

UNITED STATES PATENTS

| | | |
|---|---|---|
| 2,839,711 | Tripp | June 17, 1958 |
| 2,967,017 | Tripp | Jan. 3, 1961 |